(12) United States Patent
Mehta (10) Patent No.: US 7,038,688 B2
(45) Date of Patent: May 2, 2006

(54) FILTER MECHANISM

(75) Inventor: Kalpesh Dhanvantrai Mehta, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/747,591

(22) Filed: Dec. 29, 2003

(65) Prior Publication Data

US 2005/0140681 A1 Jun. 30, 2005

(51) Int. Cl.
G06F 13/00 (2006.01)
(52) U.S. Cl. .................. 345/519; 345/505; 345/522
(58) Field of Classification Search .......... 345/505, 345/519, 522; 715/800, 815; 382/260–265
See application file for complete search history.

(56) References Cited

U.S. PATENT DOCUMENTS

| | | | |
|---|---|---|---|
| 5,315,699 A * | 5/1994 | Imai et al. ............... 345/502 |
| 5,408,675 A * | 4/1995 | Florentino et al. .......... 715/800 |
| 5,553,200 A * | 9/1996 | Accad .................. 358/1.9 |
| 5,715,436 A * | 2/1998 | Kawai et al. ............. 345/505 |
| 5,923,339 A * | 7/1999 | Date et al. ............... 345/505 |
| 6,208,764 B1 * | 3/2001 | Archer et al. ............ 382/260 |
| 2003/0081854 A1 * | 5/2003 | Deshpande ............. 382/261 |
| 2004/0264797 A1 * | 12/2004 | Lippincott et al. ......... 382/260 |

OTHER PUBLICATIONS

Analysis of Three Algoritms for Finding all Consistent Labelings by Stanelle et al IEEE 1990.*

* cited by examiner

Primary Examiner—U Chauhan
Assistant Examiner—Mackly Monestime
(74) Attorney, Agent, or Firm—Blakely, Sokoloff, Taylor & Zafman LLP (57) ABSTRACT

According to one embodiment, a computer system is disclosed. The computer system includes an image processor. The image processor includes an image signal processor having two or more processing elements. The processing elements concurrently process an array of pixel values via a plurality of image filter comparison operations.

30 Claims, 7 Drawing Sheets

FILTER MECHANISM

FIELD OF THE INVENTION

The present invention relates to computer systems; more particularly, the present invention relates to image processing within computer systems.

BACKGROUND

Rank filters are currently implemented in image and video processing systems. A rank filter is an image-processing algorithm that replaces each pixel p by its rank relative to the pixels in some neighborhood of p. Thus if p is the brightest pixel in its neighborhood, it is mapped to white. If p is the darkest pixel, it is mapped to black. Further, if p is the median pixel, it is mapped to 50% (gray).

The problem with current rank filter algorithms is that a relatively large magnitude of processing time is required to generate an output. For example, up to 30 comparison steps may occur, demanding up to ten clock cycles of processing time.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A mechanism to implement rank and median algorithms within multiple processing elements of a signal processor is described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), execution cores, etc.).

Figure 1:
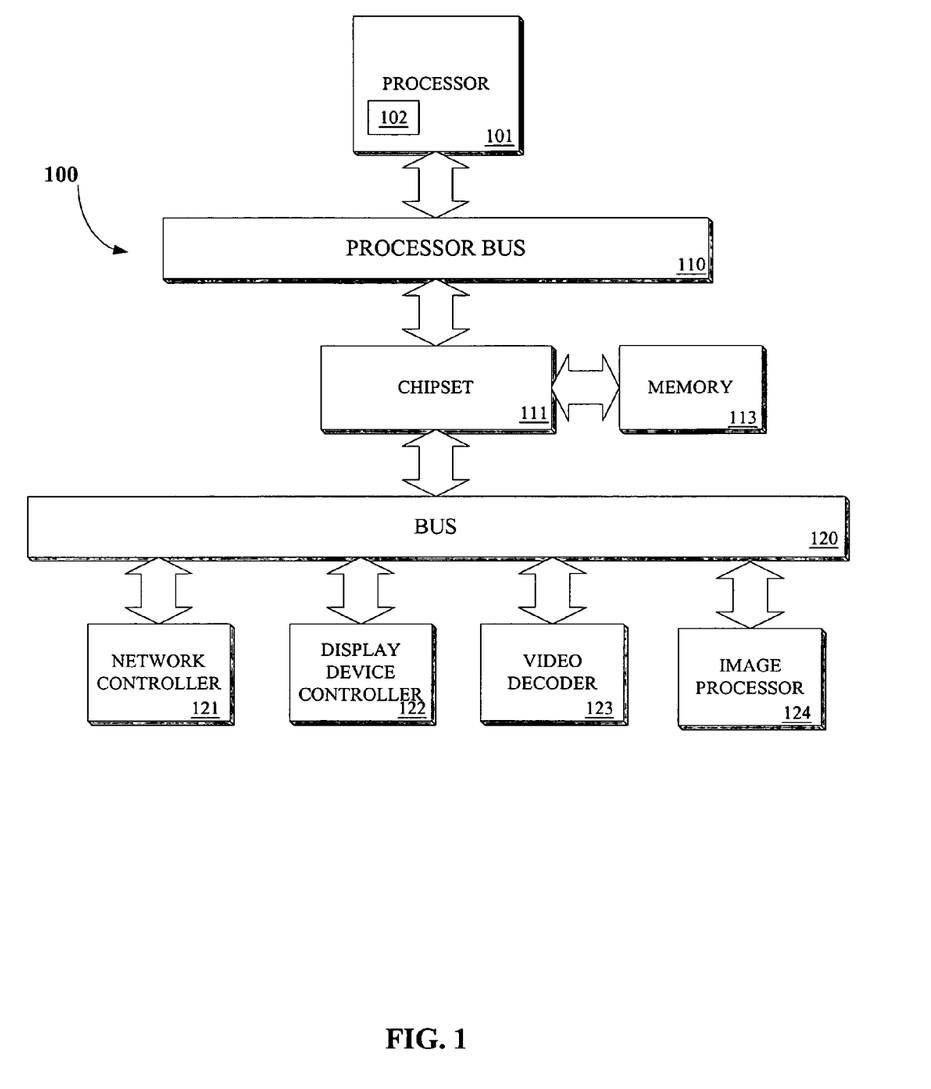
FIG. 1 is a block diagram of one embodiment of a computer system.

FIG. 1 is a block diagram of one embodiment of a computer system 100. The computer system 100 includes a processor 101 that processes data signals. Processor 101 may be a complex instruction set computer (CISC) microprocessor, a reduced instruction set computing (RISC) microprocessor, a very long instruction word (VLIW) microprocessor, a processor implementing a combination of instruction sets, or other processor device.

In one embodiment, processor 101 is a processor in the Pentium® family of processors including the Pentium® IV family and mobile Pentium® and Pentium® IV processors available from Intel Corporation of Santa Clara, Calif. Alternatively, other processors may be used. FIG. 1 shows an example of a computer system 100 employing a single processor computer. However, one of ordinary skill in the art will appreciate that computer system 100 may be implemented using multiple processors.

Processor 101 is coupled to a processor bus 110. Processor bus 110 transmits data signals between processor 101 and other components in computer system 100. Computer system 100 also includes a memory 113. In one embodiment, memory 113 is a dynamic random access memory (DRAM) device. However, in other embodiments, memory 113 may be a static random access memory (SRAM) device, or other memory device.

Memory 113 may store instructions and code represented by data signals that may be executed by processor 101. According to one embodiment, a cache memory 102 resides within processor 101 and stores data signals that are also stored in memory 113. Cache 102 speeds up memory accesses by processor 101 by taking advantage of its locality of access. In another embodiment, cache 102 resides external to processor 101.

Computer system 100 further comprises a chipset 111 coupled to processor bus 110 and memory 113. Chipset 111 directs data signals between processor 101, memory 113, and other components in computer system 100 and bridges the data signals between processor bus 110, memory 113, and a first input/output (I/O) bus 120.

In one embodiment, I/O bus 120 may be a single bus or a combination of multiple buses. In a further embodiment, I/O bus 120 may be a Peripheral Component Interconnect adhering to a Specification Revision 2.1 bus developed by the PCI Special Interest Group of Portland, Oreg. In another embodiment, I/O bus 120 may be a Personal Computer Memory Card International Association (PCMCIA) bus developed by the PCMCIA of San Jose, Calif. Alternatively, other busses may be used to implement I/O bus. I/O bus 120 provides communication links between components in computer system 100.

A network controller 121 is coupled I/O bus 120. Network controller 121 links computer system 100 to a network of computers (not shown in FIG. 1) and supports communication among the machines. In one embodiment, computer system 100 receives streaming video data from a computer 110 via network controller 121.

A display device controller 122 is also coupled to I/O bus 120. Display device controller 122 allows coupling of a display device to computer system 100, and acts as an interface between the display device and computer system 100. In one embodiment, display device controller 122 is a monochrome display adapter (MDA) card.

In other embodiments, display device controller 122 may be a color graphics adapter (CGA) card, an enhanced graphics adapter (EGA) card, an extended graphics array (XGA) card or other display device controller. The display device may be a television set, a computer monitor, a flat panel display or other display device. The display device receives data signals from processor 101 through display device controller 122 and displays the information and data signals to the user of computer system 100.

A video decoder 123 is also coupled to I/O bus 120. Video decoder 123 is a hardware device that translates received encoded data into its original format. According to one embodiment, video decoder 123 is a Moving Picture Expert Group 4 (MPEG-4) decoder. However, one of ordinary skill in the art will appreciate that video decoder 123 may be implemented with other types of MPEG decoders.

An image processor 124 is also coupled to I/O bus 120. In one embodiment, image processor 124 is a parallel, scalable, programmable processor that executes image data received at computer system 100. However, one of ordinary skill in the art will appreciate that processor 124 may be implemented for other processing applications (e.g., digital video).

Figure 2:
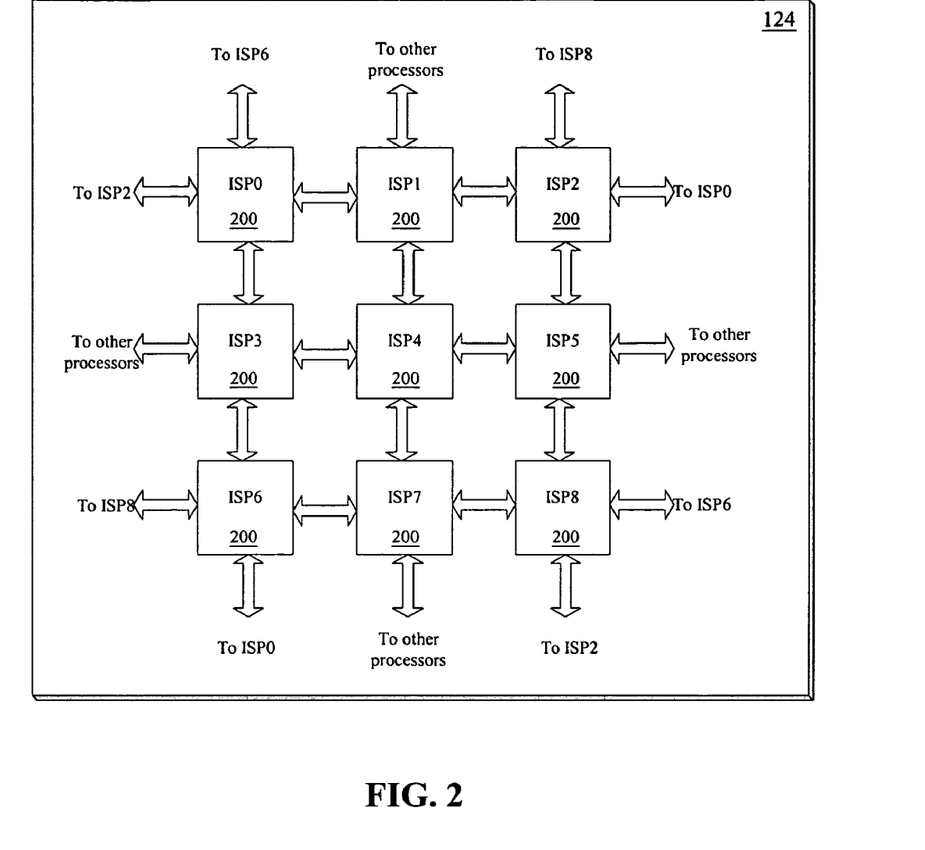
FIG. 2 illustrates one embodiment of an image processing integrated circuit.

FIG. 2 illustrates one embodiment of image processor 124. Image processor 124 includes a multitude of image signal processors (ISPs) 200. In one embodiment, image processor 124 includes nine ISPs 200 (ISP0–ISP8) coupled to each other via programmable ports (quad ports). In addition, the quad ports may couple the ISPs to dual data rate SDRAMs (DDRs), not shown.

Figure 3:
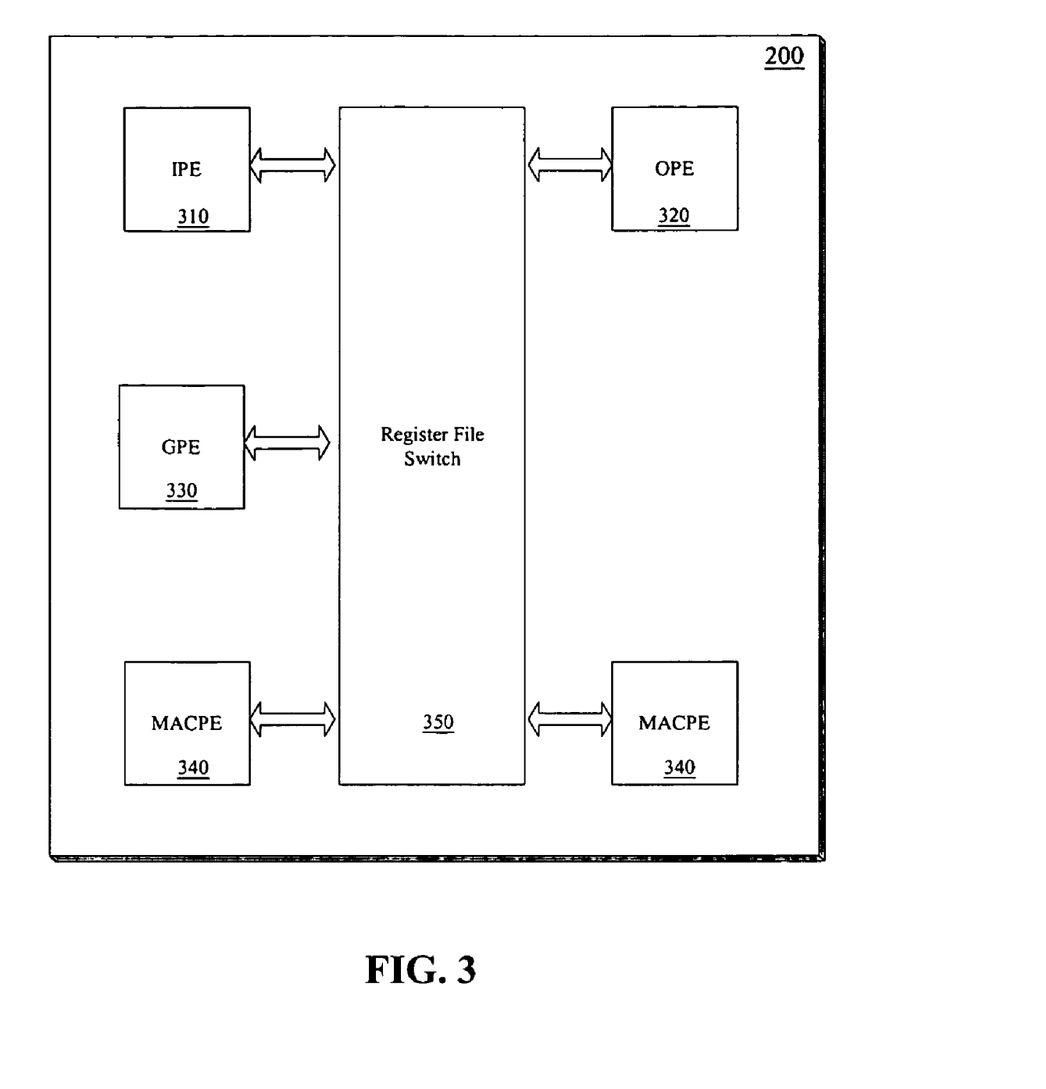
FIG. 3 illustrates one embodiment of an image signal processor.

FIG. 3 illustrates one embodiment of an ISP 200. ISP 200 includes various processing elements (PEs) coupled to a register file switch 350. In particular the PEs include an input PE (IPE) 310, an output PE (OPE) 320, a general purpose PE (GPE) and two multiply-accumulate PEs (MACPEs) 340. Register file switch 350 provides a fast and efficient interconnect mechanism between the PEs.

In one embodiment, individual threads are mapped to the PE's in such a way as to minimize the communication overhead. In a further embodiment, the programming model of ISPs 200 is such that each PE implements a part of an algorithm and data flows from one PE to another and from one ISP to another until the data is completely processed.

According to one embodiment, each PE uses a data driven mechanism to process data. In this method, each piece of data in the system has a set of Data Valid (DV) bits that indicate for which PE the data is intended. Thus, if a register data is intended for two PE's (e.g., GPE 330 and a MACPE 340), the DV bits 0 and 1 of the register is set. If GPE 330 no longer needs the data, then it resets the DV bit.

When the DV bits for all of the consumer PEs in a register are reset, the producer PE can go ahead and write new data into the register with new set of DV bit setting. Otherwise, the producer PE is stalled until the consumer PE's have reset their respective DV bits. Similarly, if a PE attempts to read a piece of data from a register and if its DV bit is not set, the PE stalls until there is a data with DV bit corresponding to the consumer PE set. This mechanism provides a method to share and use registers and significantly simplifies the user-programming model.

IPE 310 is coupled to quad ports to receive input data streams and to route the data to other PEs within an ISP 200. OPE 320 is coupled to quad the ports to transmit outgoing data streams (e.g., to an adjacent ISP 200) once the data has been processed at the ISP 200. GPE 330 is a basic PE upon which the other PEs are constructed. MACPEs 240 performs mathematic functions, such as multiply and accumulate, for a particular ISP 200. Although not shown in FIG. 3, each PE includes a multitude of local registers (LRs) and indirect registers (IRs), not shown.

According to one embodiment, the PEs within ISP 200 are implemented to perform rank and median filter algorithms. Rank filters are a class of non-linear filter commonly used in image and video processing. The rank filter operates on a set of pixel values. Rank filter of order n arranges input pixel values in ascending order of magnitude and outputs $n^{th}$ element. For example, a 3×3 rank filter receives a 2-D array of 3 rows of 3 elements each. The input pixel values are arranged in ascending order of magnitude and rank (5) outputs the $5^{th}$ element of this sorted array.

One approach is to sort the 9-element array using bubble sort or quick sort and then pick the fifth element. An alternative would be to sort until the fifth element. The fifth element represents the median value of the array. The median value is to reduce noise in an image. This approach of sorting until the fifth element involves 30 comparisons (e.g., 8 comparison to obtain the $1^{st}$ element, 7 comparison to obtain the $2^{nd}$ element . . . , and 4 comparison to obtain the $5^{th}$ element).

Figure 4:
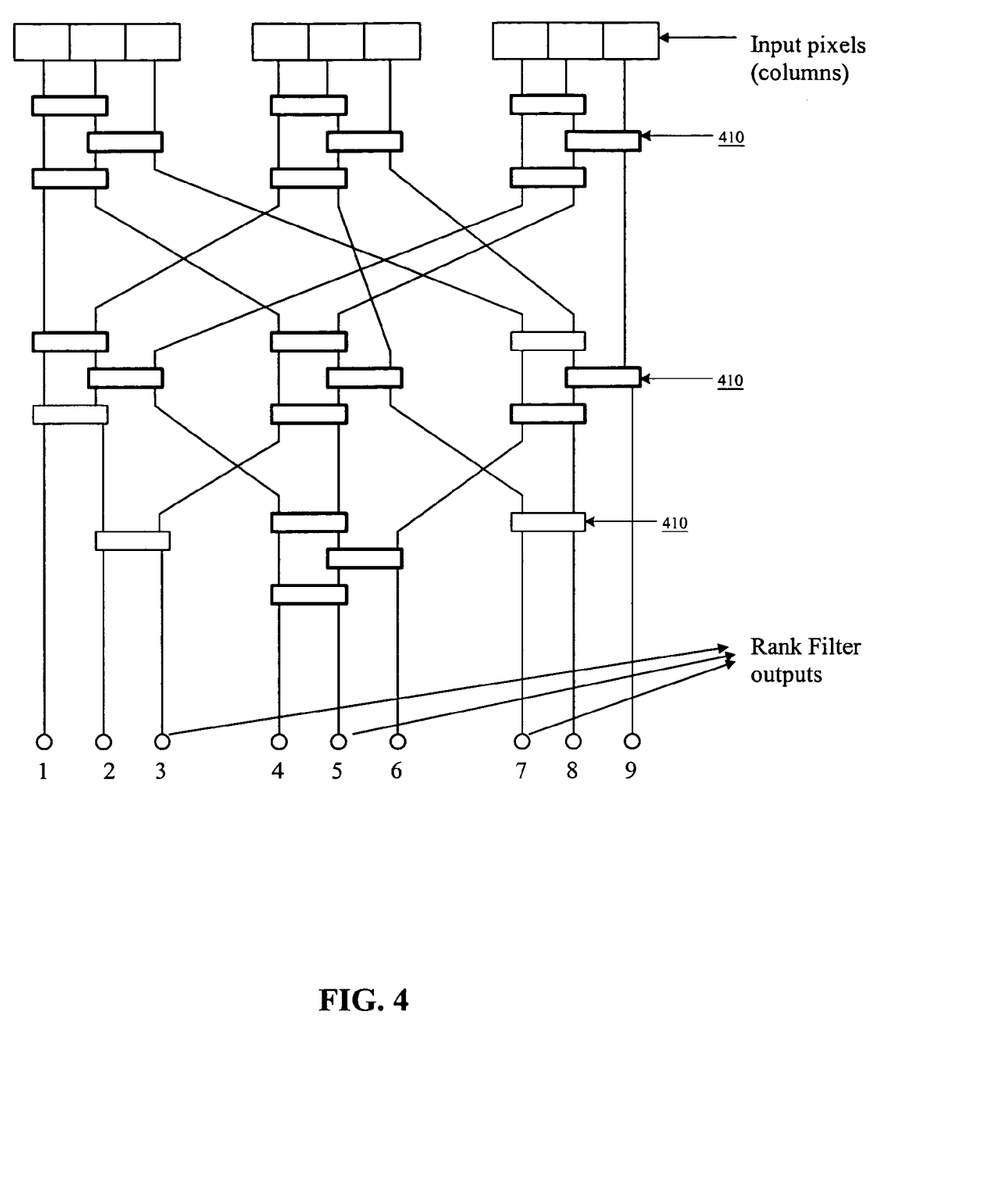
FIG. 4 illustrates one embodiment of a rank algorithm.

Another approach is the Waltz algorithm. FIG. 4 illustrates one embodiment of the Waltz all-rank algorithm. The algorithm is implemented via a multitude of comparison operations 410. The comparison operations 410 compare two input values and provides two output values. The left output represents the minimum value of the compared values, while the right output represents the maximum of the two. As shown in FIG. 4, twenty-three comparison operations 410 are used to rank nine values. However, only nineteen comparison operations 410 are involved in calculating the fifth element. These comparison operations 410 are represented in bold-faced blocks.

Figure 5:
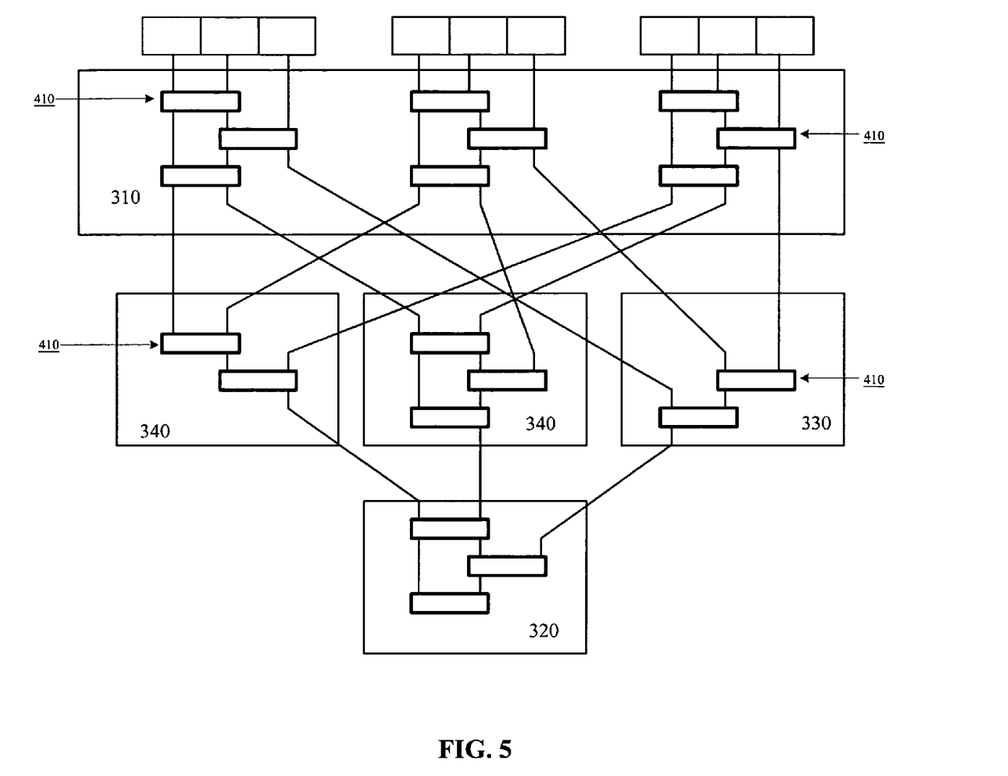
FIG. 5 illustrates one embodiment of a rank algorithm implemented within image processing elements.

In one embodiment, the Waltz algorithm is processed by mapping the various comparison operations to different PEs to calculate a median filter. FIG. 5 illustrates one embodiment of a median filter algorithm implemented within an ISP 200. According to one embodiment, the array is received at an ISP 200 in two-pixel columns. Referring to FIG. 5, the first stage of the median filter comparison operations 410 are performed at IPE 310 to sort the pixel values. In addition, the second stage of comparison operations 410 are separated between GPE 330 and the MACPEs 340.

In one embodiment, the left-most MACPE 340 calculates the maximum of the minimum values received from IPE 310. The second MACPE calculates the median of the median values received from IPE 310. Further, GPE 330 calculates the minimum of maximum the values received from IPE 310. OPE 320 receives the maximum minimum value, the median of median value and the minimum maximum value and outputs the median value.

Figure 6:
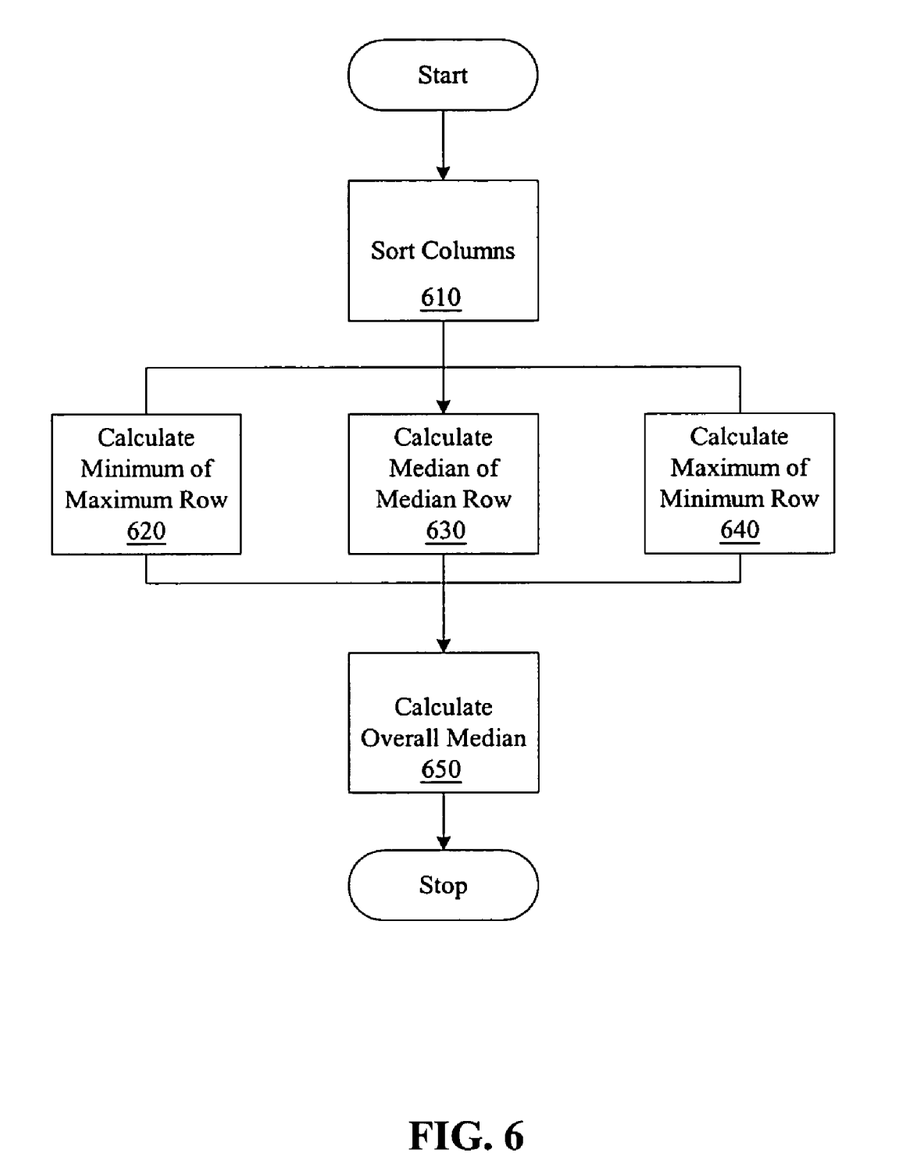
FIG. 6 is a flow diagram of one embodiment of implementing a rank algorithm within image processing elements.

FIG. 6 is a flow diagram of one embodiment of implementing a median algorithm within an ISP 200. At processing block 610, the input pixels are sorted. In one embodiment, columns of input pixels are sorted so that minimum is in row0, median in row1 and maximum in row2. This may be performed in IPE 310 in packed format (2 pixels at a time).

In one embodiment, IPE 310 uses Dual MIN (MNMN) and Dual MAX (MXMX) instructions to sort the incoming columns of data (2 columns at a time). In one embodiment, the data is fed from the north quad port and the result is output to general-purpose registers within the ISP 200. The Dual min operation compares the low and high bytes of LR0 and LR1 and the minimum is placed in a destination register (e.g., LR2)

At processing block 620, the minimum of maximum rows (RowMax) is calculated. In one embodiment, a maximum of 3 elements of row0 (min row) is computed at the left-most MACPE 340, one pixel at a time. Thus, MACPE 340 takes the maximum of a row of minimums. The data for this is received from the GRs (e.g., pre-sorted columns from IPE 310) and the result is written out to a GR for OPE 320. In one embodiment, data is in GR0 (low and high byte) and GR4 (high byte).

At processing block 630, the median of median row (RowMed) is calculated. At this stage, the median of 3 element of row1 (median row) is computed at the second MACPE 340, one pixel at a time. The MACPE 340 takes the median of a row of medians. The data comes from the GRs and the result is written out to a GR for OPE 320. In one embodiment, the data is in GR1 (low and high byte) and GR5 (high byte).

At processing block 640, the maximum of minimum row (RowMin) is calculated. In this stage, the minimum of 3 element of row2 is computed at GPE 330, one pixel at a time. In one embodiment, GPE takes the minimum of a row of maximums. The data comes from the GRs (pre-sorted columns from IPE 310) and the result is written out to the GR for OPE 340. In one embodiment, the data is in GR2 (low and high byte) and GR6 (high byte).

At processing block 650, the overall median is calculated. In this stage, the median of RowMax, RowMed and RowMin is computed at OPE 320, one pixel at a time. The result is overall median of 3×3 pixels. The data for this comes from the GRs (as computed by MACPEs 340 and GPE 330) and the result is written out to the south quad port. In one embodiment, the data is in GR12 (low and high byte), GR13 (high byte), and GR14 (low and high byte).

Since the PEs are running concurrently, the maximum throughput is limited by the PE that takes longest to produce an output. In one embodiment, the PE that computes RowMed (5 clocks) is the longest. Therefore the median can be computed in five clock cycles.

Note that the ISP 200 pipeline described above could also be used to compute any rank, or an all-rank filter. The all-rank filter for the Waltz algorithm has error. The Waltz's data flow diagram fails for several test cases. The trivial case for which it fails is where the input data is pre-sorted (1, 2, 3, 4, 5, 6, 7, 8, and 9).

Figure 7:
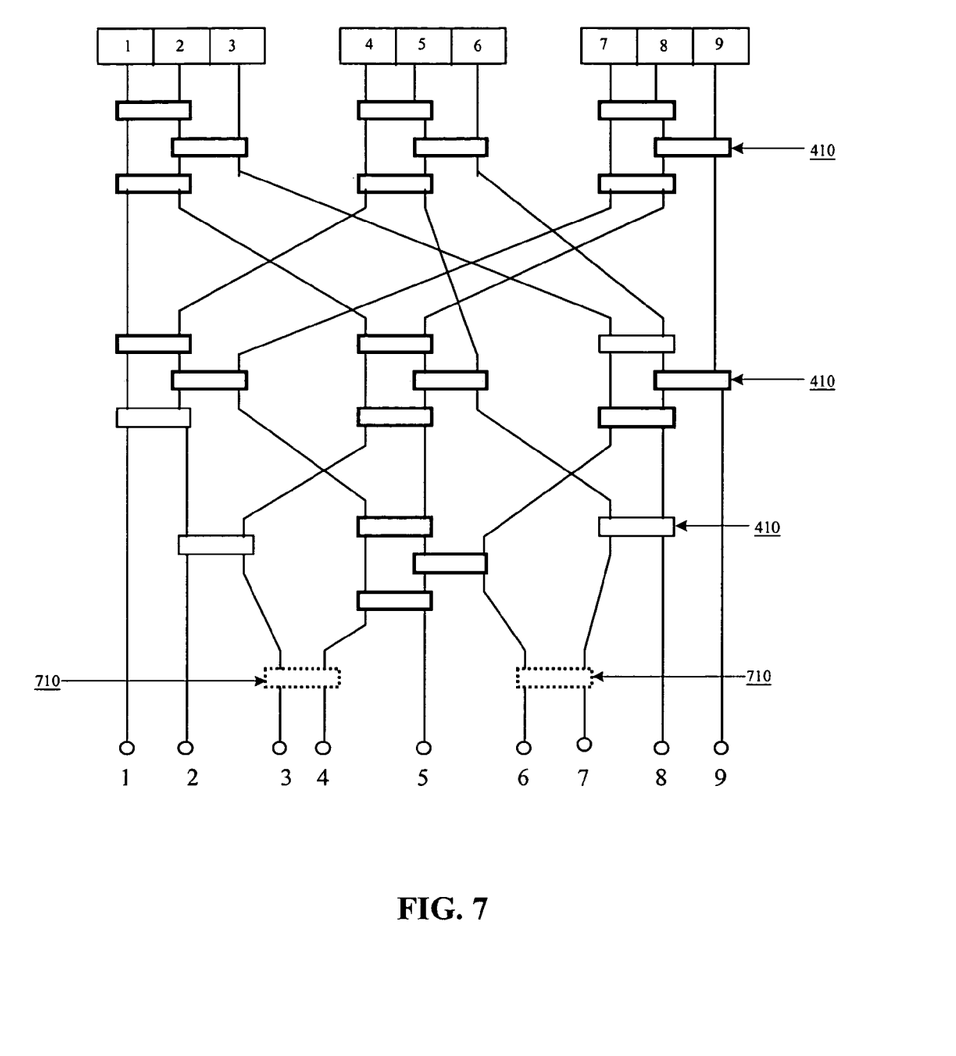
FIG. 7 illustrates another embodiment of a rank algorithm.

FIG. 7 illustrates embodiment of a corrected Waltz rank algorithm. In the original data flow diagram, there was no path from the 4 to rank 4 output. In the corrected algorithm, a path has been added. This path includes comparison operations 710. The result of the path insertion is to correct rank order filters from 1 through 9.

A highly efficient method of implementing rank filter for an ISP structure has been described above. The described mapping method takes advantage of the broadcast nature of General Purpose Registers and uses all of the resources available within an ISP to provide very high throughput for 3×3 median filtering. The median filtering (3×3 in particular) is considered an important benchmark for many image and video processing application. In addition, the generalized all-rank filter Waltz algorithm has been corrected so that the proposed mapping method can be used to implement any 3×3 rank filter in an ISP.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A system comprising:
an image processor including a first image signal processor (ISP) having:
an input PE (IPE);
an output PR (OPE);

a general-purpose PE (GPE);
a first multiply and accumulate PE (MACPE);
a second MACPE; and
a switch coupled between the IPE, OPE, GPE, first MACPE and the second MACPE to transmit data.

2. The system of claim 1 wherein the image processor further comprises:
a quad port coupled to the first ISP; and
a second ISP coupled to the quad port.

3. The system of claim 1 wherein the filter comparison operations are processed as functions of a median filter.

4. The system of claim 1 wherein the filter comparison operations are processed as functions of a rank filter.

5. The system of claim 4 wherein the rank filter comprises a Waltz rank algorithm.

6. The system of claim 1 wherein the IPE performs a first set of comparison operations to sort the array of pixel values.

7. The system of claim 6 wherein the first MACPE performs a second set of comparison operations to calculate a maximum of minimum of the sorted pixel values received from IPE.

8. The system of claim 7 wherein the second MACPE performs a third set of comparison operations to calculate a median of median of the sorted pixel values received from IPE.

9. The system of claim 8 wherein the GPE performs a fourth set of comparison operations to calculate a minimum of maximum of the sorted pixel values received from IPE.

10. The system of claim 9 wherein the OPE performs a fifth set of comparison operations to calculate a median value.

11. A method comprising:
receiving an image pixel array at an image signal processor;
performing a first set of filter comparison operations at a first processing element (PE) to process pixel values of the image pixel array by sorting the image pixel array; and
performing a second set of filter comparison operations at a second processing PE to process the pixel values by calculating a maximum of minimum of the sorted pixel values.

12. The method of claim 11 wherein performing the second set of filter comparison operations comprises calculating a median of median of the sorted pixel values.

13. The method of claim 11 further comprising performing a third set of filter comparison operations to calculate a median of median of the sorted pixel values.

14. The method of claim 13 further comprising performing a fourth set of filter comparison operations to calculate a median value.

15. A processor comprising:
a first image signal processor (ISP) having:
an input PE (IPE) to perform a first set of comparison operations to sort the array of pixel values;
a first multiply and accumulate PE (MACPE) to perform a second set of comparison operations to calculate a maximum of minimum of the sorted pixel values received from IPE; and
a switch coupled to transmit data between the IPE and the first MACPE.

16. The processor of claim 15 further comprising:
a quad port coupled to the first ISP; and
a second ISP coupled to the quad port.

17. The processor of claim 15 wherein the filter comparison operations are processed as functions of a median filter.

18. The processor of claim 15 wherein the filter comparison operations are processed as functions of a rank filter.

19. The processor of claim 18 wherein the rank filter comprises a Waltz rank algorithm.

20. The processor of claim 15 wherein the ISP further comprises:
an output PR (OPE);
a general-purpose PE (GPE); and
a second MACPE.

21. The processor of claim 20 wherein the switch is coupled between the IPE, OPE, GPE, first MACPE and the second MACPE.

22. The processor of claim 20 wherein the second MACPE performs a third set of comparison operations to calculate a median of median of the sorted pixel values received from IPE.

23. The processor of claim 22 wherein the GPE performs a fourth set of comparison operations to calculate a minimum of maximum of the sorted pixel values received from IPE.

24. The processor of claim 23 wherein the OPE performs a fifth set of comparison operations to calculate a median value.

25. A system comprising:
a central processing unit (CPU);
a chipset coupled to the CPU;
a memory device coupled to the chipset; and
an image processor, coupled to the chipset, having a first image signal processor (ISP) having:
an input PE (IPE) to perform a first set of comparison operations to sort the array of pixel values;
a first multiply and accumulate PE (MACPE) to perform a second set of comparison operations to calculate a maximum of minimum of the sorted pixel values received from IPE; and
a switch coupled to transmit data between the IPE and the first MACPE.

26. The system of claim 25 wherein the ISP comprises:
an output PR (OPE);
a general-purpose PE (GPE); and
a second MACPE.

27. The system of claim 26 wherein the switch is coupled between the IPE, OPE, GPE, first MACPE and the second MACPE.

28. The system of claim 26 wherein the second MACPE performs a third set of comparison operations to calculate a median of median of the sorted pixel values received from IPE.

29. The system of claim 28 wherein the GPE performs a fourth set of comparison operations to calculate a minimum of maximum of the sorted pixel values received from IPE.

30. The system of claim 29 wherein the OPE performs a fifth set of comparison operations to calculate a median value.

* * * * *